July 22, 1958  M. F. FABER  2,844,258
RACK WITH POCKETS
Filed June 11, 1954
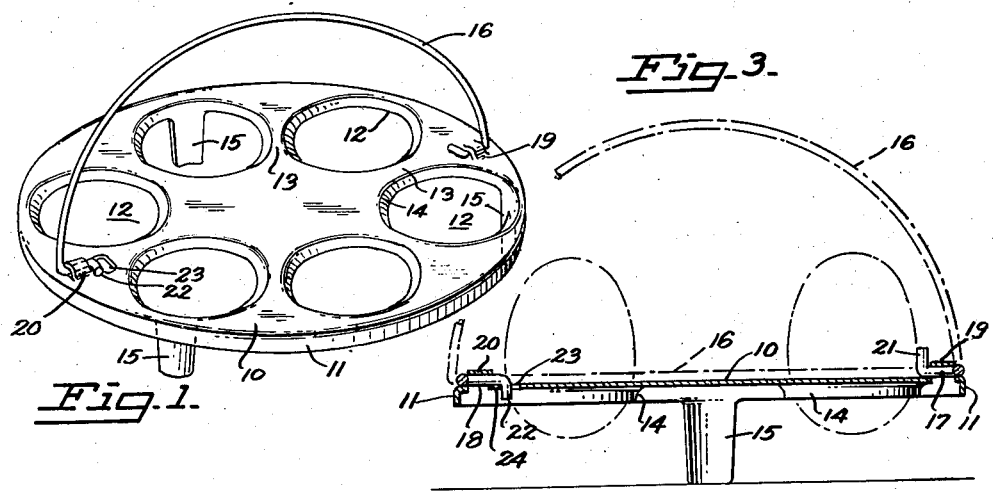
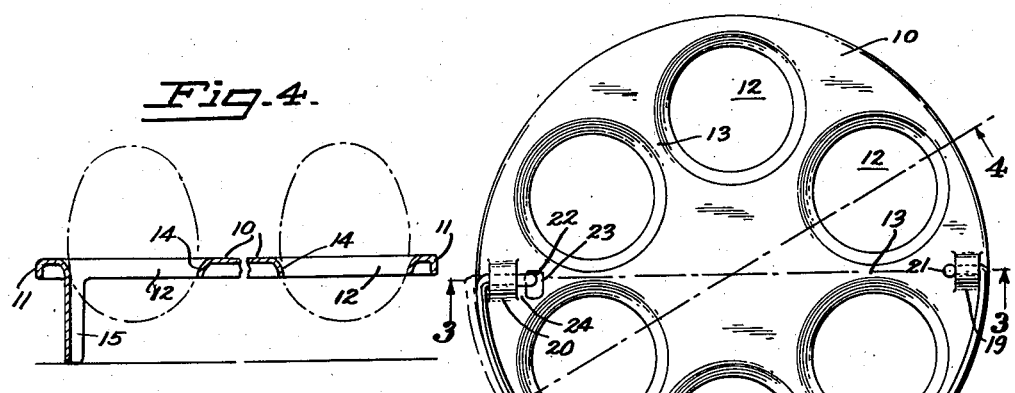
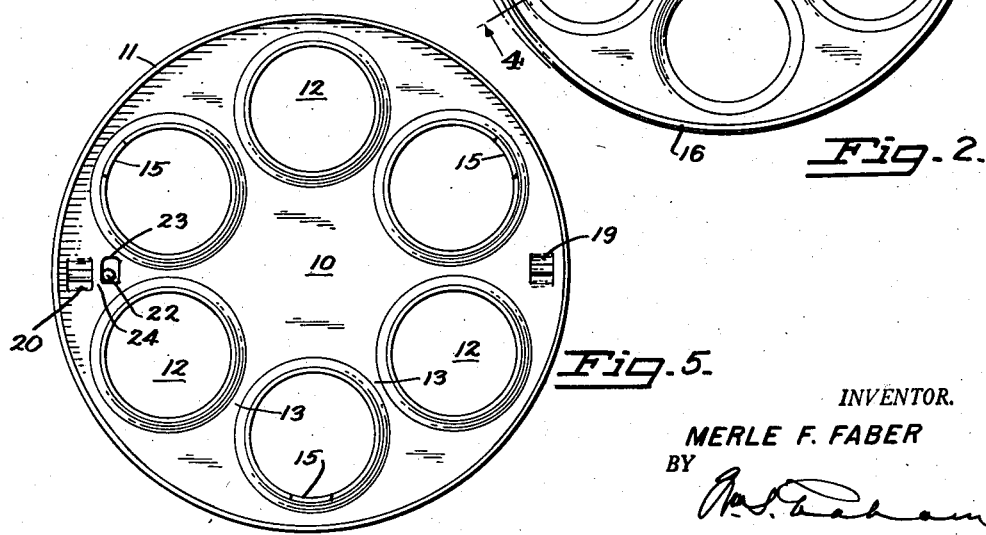
INVENTOR.
MERLE F. FABER
BY
ATTORNEY

2,844,258

RACK WITH POCKETS

Merle F. Faber, Millbrea, Calif.

Application June 11, 1954, Serial No. 436,199

5 Claims. (Cl. 211—14)

This invention relates to racks having folding bail handles for holding in pockets various types of relatively small articles, especially those having a generally circular form at the portion of the body which is engaged by the pocket, such as eggs, small jars, and the like.

Briefly stated, the invention comprises a planar plate body having an integral peripheral reinforcing flange, the plate body having a plurality of openings providing pockets therein, the plate body and the pocket openings being preferably circular in plan as exemplified herein, and having legs which are preferably arcuate in transverse section and positioned so that they may be stamped from the metal struck from the plate body in the making of the openings. A bail handle is provided extending arcuately between termini of a diameter of the plate body, the bail or handle being hinged and foldable from an upstanding position overlying said diameter to a position overlying and substantially congruent with the periphery of a semicircular segment of the planar plate body, the bail at its upstanding position having releasable locking engagement with the plate body.

The objects of the invention are to provide a planar plate rack having pocket openings therein for receiving and supporting suitable objects engaged in the openings, the plate body having legs arcuate in cross section to resist bending thereof and which space the planar body from a supporting surface, together with an arcuate bail handle which may be selectively releasably locked at an upstanding position diametrally of the planar body, and foldable into closely overlying substantial contact with the planar body with the arc substantially congruent with the periphery of the planar body, the arc of the bail providing a degree of resilience between its ends, and also being of a suitable curvature which adapts the bail to pass the articles which would ordinarily be held in the plate openings, such as eggs or small jars.

A preferred form in which the invention may be embodied is described herein and illustrated in the accompanying drawing in which:

Fig. 1 is a perspective view of the device of the invention;

Fig. 2 is a top plan view of the device shown in Fig. 1, with bail handle at downward position;

Fig. 3 is a vertical transverse section on line 3—3 of Fig. 2, with bail handle shown in broken lines at selective downward and upward positions;

Fig. 4 is a fragmentary vertical section on line 4—4 of Fig. 2, and

Fig. 5 is a bottom or underside view of Fig. 2.

Referring to the drawing in which like reference characters indicate corresponding parts in the several views, 10 is a planar carried plate body preferably of sheet metal circular in plan and having an integral peripheral downturned reinforcing flange 11. The planar plate body has a plurality of circular openings 12 stamped therethrough, six being shown in the present exemplification, preferably evenly relatively spaced circularly by reinforcing ribs 13 therebetween radial to the center of the plate body, the circumferential edge portions of the openings being arcuately turned downwardly in lips 14. Eggs are shown in broken lines seated in openings 12 in Figs. 3 and 4 as illustrative of use of the invention. Integral legs 15 extend downwardly from the inner edge of the lips 14 of openings 12, the legs being illustrated in the present example at alternate openings 12, the legs obviously being to space the plate body from a surface on which it is supported. In transverse section these legs are arcuate in the diametral plane of the carrier plate body preferably in the same degree as the arc in the openings 12 and are thus reinforced against bending, and may also be thus integrally formed from a tongue portion of the metal which is stamped out to form the openings 12 and bent downwardly from the inner edges of the lips 14, substantially perpendicularly to the plate body.

A foldable arcuate supporting bail handle 16 is hingedly mounted at the opposite ends of a diameter of the plate body, the arc of the bail being substantially the same as the arc of the peripheral edge of the plate body, firstly so that when the bail is at upstanding or vertical position the support of the plate body will be a two-point suspension from the bail at the opposite termini of a diameter of the plate, and thus hold the plate in equilibrium or balance to support the weight of the rack and contents; secondly, so that the bail may be collapsed downwardly to closely overlie the planar body to decrease the vertical height of the rack for insertion into a smaller space; thirdly, so that the collapsed bail will overlie and be substantially congruent with the peripheral edge of the planar body and thus not interfere with the central usable area of the planar body and its pocket openings; fourthly, so that in collapsing the bail it will pass over such articles which would normally be placed in the pocket openings 12, such as eggs and small jars. Due to being arcuate the bail has a degree of resilience between its ends whereby its terminal ends may be pressed toward each other, which is a factor in the releasably locking and unlocking of the bail at such position, the resilience providing cooperation with a hinge and locking means for that purpose.

The bail has at each end an integral portion, 17 and 18, inturned toward each other substantially perpendicularly in the plane of the bail, the inturned portions providing hinge pins engaged under upformed hinge strips 19, 20, at opposite diametral portions of the plate body. The opposite inturned hinge pin portions of the bail terminate in tongues 21, 22, inwardly beyond the hinged strips, the tongues being turned perpendicular to the hinge pin portion and to the plane of the bail, and turned in opposite directions relative to each other. Thus the perpendicularly turned tongues lock the hinge pins against inadvertent removal from the hinges. Adjacently spaced from one of the hinge strip portions is a stamped-out latch opening 23 in the plate body, preferably of elongated form, the space, which is designated as a lock space 24, being substantially equal to the width or thickness of the corresponding bail tongue. Thus, when the bail is collapsed flat upon the plate body, as shown in Fig. 2, the tongue 21 is turned vertically upward and the tongue 22 is turned downward through the elongated latch opening 23, the friction of the tongue 22 against the side edge of the opening due to the resilience of the bail thus providing a readily yielding friction brake against a complete free swinging of the bail, at least sufficiently so that it will not be free to swing at random when at a collapsed position. When the bail is elevated to an upstanding position, as shown in Fig. 1, the tongue 21 contacts the upper face of the planar body and prevents movement of the bail beyond the vertical, whereas, when the bail is so elevated, the tongue 22 is raised free of the opening 23 and, due to the resilience, that end of the bail snaps radially outwardly whereupon the tongue 22 is engaged by the upper face of the planar body in the space 24. Since the tongue 22 points oppositely from the tongue 21, the bail and the plate are thus locked against the relative movement in either direction, and the bail is firmly held erect at its elevated upstanding position. The bail may be released or unlocked by pressing its locked end radially and resiliently inwardly until the tongue 22 again overlies the opening 23, whereupon the bail may again be collapsed to overlie the peripheral edge portion of the planar body.

Having thus described the invention, what is claimed as new and patentable is:

1. A rack for holding articles which are substantially circular in a transverse section perpendicular to the axis of said articles, said rack including a substantially circular planar plate body member having legs for spacing the plate from a supporting surface, a plurality of circular pocket openings in the plate body for receiving the articles therein, said openings having downturned flanged lips at the edge of the openings, said plate body having integral upformed strips providing hinges at opposite diametral positions adjacent the periphery, said plate body having a latch opening therethrough adjacently spaced radially inwardly from one of said hinge strips to provide a lock space between the hinge and the latch opening, an arcuate bail handle member having an arc substantially similar to the arc of the periphery of the plate body and having a degree of resiliency between its ends due to its arc, said bail having at its opposite ends hinge pin portions turned inwardly relatively in the plane of the bail and swivelly engaged under the hinge strips, said hinge pin portions each having a terminal end portion thereof extending inwardly beyond the hinge strip and turned at an angle thereto and providing a tongue substantially perpendicular to the plane of the bail, the said tongues being turned in opposite directions relatively and one of said tongues being adapted to turn downwardly into said latch opening when the opposite ends of the bail are relatively contracted radially and the bail is collapsed downwardly to overlie the peripheral portion of the plate body, said one tongue being adapted for snapping to a position overlying the lock space of the plate body responsive to the resilience of the bail when the bail is moved to an upstanding position perpendicular to the planar body.

2. A rack of the character described for holding articles, including the elements of claim 1 and in which the legs are arcuate in transverse section in the diametral plane of the plate body and are integral with and extend downwardly substantially perpendicular to the plane of the edge of the lips of the pocket openings in the planar body.

3. A rack for holding suitable articles, comprising a substantially circular planar carrier plate body member having legs to support said body in spaced relation to a supporting surface, said carrier body having a plurality of pocket openings in the planar body thereof for receiving said articles therein, said plate having hinged strips upformed from its plate body at opposite diametral positions adjacent the periphery, a bail handle bent to substantially correspond with the peripheral edge of the plate body, said bail being resiliently springable across the gap between its opposite ends and having its opposite ends turned inwardly in the plane of the bail to provide hinge pins which are pivotally disposed under said hinge strips whereby said bail may be selectively moved between an upstanding position transversely of the plate and a position substantially in facial contact with the periphery of the plate body, said hinge pins extending inwardly beyond the hinge strips and having their extended terminal end portions turned perpendicularly to the plane of the bail and oppositely relative to each other and thereby providing locking tongues, said carrier body having a latch opening adjacently spaced radially inwardly from one of the hinge strips sufficiently to be accessible for receiving the adjacent locking tongue when the ends of the bail are relatively contracted across the diameter of the carrier body, and said spacing of said latch opening providing an area of body material between the adjacent hinge strips and the latch opening for receiving thereagainst the adjacent locking tongue whereby the bail is maintained at an upstanding position when the opposite ends of the bail are sprung relatively radially outwardly responsive to the resilience of the bail.

4. A rack for holding suitably shaped articles comprising a planar plate body member having a circularly arcuate peripheral edge and having supporting legs, a plurality of pocket openings in the plate body for receiving said articles therein, said plate body having hinge strips at opposite diametral positions adjacent the periphery and having a latch opening adjacently spaced radially inwardly from one of said hinge strips, an arcuate bail handle member having an arc substantially similar to the arc of the peripheral edge of the carrier plate body and having a degree of resiliency between its ends due to its arc, said bail having at its opposite ends hinge pin portions turned relatively inwardly in the plane of the bail, and pivotally engaged under said hinge strips, said hingle pins each having at its terminal end a tongue which is inwardly beyond the hinge strips and which is turned substantially perpendicular to the hinge pin, and which respectively, extends in opposite directions relatively, one of said tongues being adapted to enter said latch opening when the opposite ends of the resilient bail are radially contracted relatively and the bail is collapsed upon the plate body, and both of said tongues being adapted to engage the upper face of the plate body when the opposite ends of the bail are expanded relatively and the bail is at an upstanding position.

5. A rack device of the character described having the elements of claim 4 and in which the supporting legs are arcuate in transverse section in the diametral plane of the carrier plate and extend downwardly substantially perpendicular to the plane of the edge of the pocket openings in the plate body.

References Cited in the file of this patent

UNITED STATES PATENTS

| | | |
|---|---|---|
| D. 160,379 | Finch | Oct. 10, 1950 |
| 686,841 | Bertels | Nov. 19, 1901 |
| 993,163 | Grilk | May 23, 1911 |
| 1,184,811 | Berger | May 30, 1916 |
| 1,346,283 | Vierling et al. | July 13, 1920 |